United States Patent
Hartmann et al.

(10) Patent No.: US 7,030,762 B2
(45) Date of Patent: Apr. 18, 2006

(54) ANTI-COLLISION INTERROGATION PULSE FOCUSING SYSTEM FOR USE WITH MULTIPLE SURFACE ACOUSTIC WAVE IDENTIFICATION TAGS AND METHOD OF OPERATION THEREOF

(75) Inventors: Clinton S. Hartmann, Dallas, TX (US); Lewis T. Claiborne, Richardson, TX (US)

(73) Assignee: RF Saw Components, Inc., Richardson, TX (US)

( * ) Notice: Subject to any disclaimer, the term of this patent is extended or adjusted under 35 U.S.C. 154(b) by 223 days.

(21) Appl. No.: 10/326,540

(22) Filed: Dec. 20, 2002

(65) Prior Publication Data

US 2003/0179093 A1 Sep. 25, 2003

Related U.S. Application Data

(63) Continuation-in-part of application No. 10/103,650, filed on Mar. 21, 2002.

(51) Int. Cl.
*G08B 13/14* (2006.01)

(52) U.S. Cl. .................... 340/572.7; 340/10.2; 342/44; 367/138

(58) Field of Classification Search ............ 340/572.1, 340/572.4, 572.7, 10.1, 10.2; 342/42, 44; 367/138; 343/700 R See application file for complete search history.

(56) References Cited

U.S. PATENT DOCUMENTS

| | | | | |
|---|---|---|---|---|
| 3,852,755 A | * | 12/1974 | Works et al. | 343/701 |
| 4,058,217 A | * | 11/1977 | Vaughan et al. | 209/559 |
| 4,445,028 A | * | 4/1984 | Huber | 235/462.01 |
| 5,381,137 A | | 1/1995 | Ghaem et al. | |
| 5,701,127 A | * | 12/1997 | Sharpe | 340/10.2 |
| 5,734,326 A | | 3/1998 | Skudera, Jr. | |
| 5,777,561 A | | 7/1998 | Chieu et al. | |
| 6,069,564 A | | 5/2000 | Hatano et al. | |
| 6,259,991 B1 | * | 7/2001 | Nysen | 340/10.1 |
| 6,318,636 B1 | | 11/2001 | Reynolds et al. | |
| 6,462,698 B1 | * | 10/2002 | Campbell et al. | 342/42 |
| 6,611,224 B1 | * | 8/2003 | Nysen et al. | 342/42 |

FOREIGN PATENT DOCUMENTS

WO 00/50849 8/2000

OTHER PUBLICATIONS

Johnson R.C., "Antenna Engineering Handbook, Third Edition" 1993; McGraw-Hill; US XP002251973 ISBN: 0-07-03281-X; Chapter 10: Leaky-Wave Antennas; Chapter 13: Helical Antennas; Chapter 17: Reflector Antennas; Chapter 20: Phased Arrays.

* cited by examiner

*Primary Examiner*—Thomas Mullen

(57) ABSTRACT

The present invention provides a system for avoiding code collisions from multiple SAW identification tags and a method of operating such system. In one embodiment the invention provides for (1) focusing an interrogation pulse to within a defined space; and (2) discriminating between coded responses returned from tags located within such defined space.

25 Claims, 13 Drawing Sheets

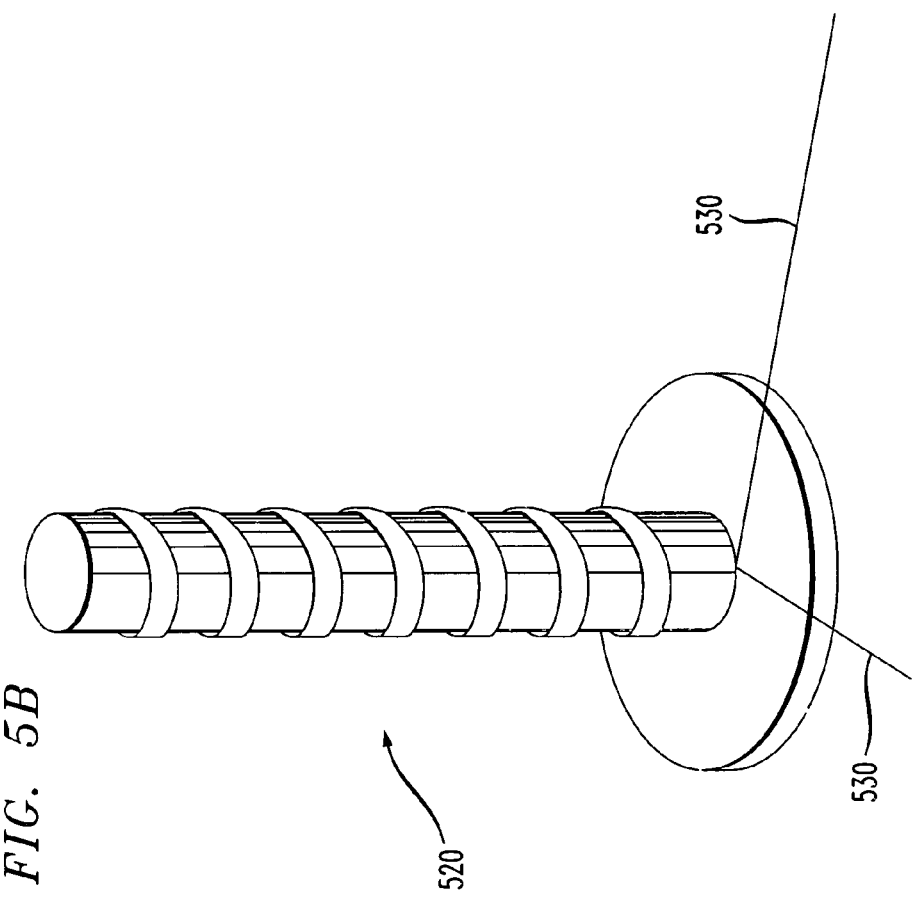
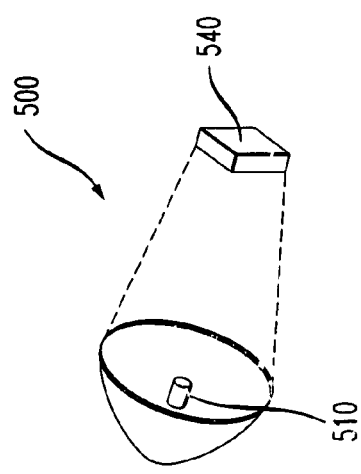

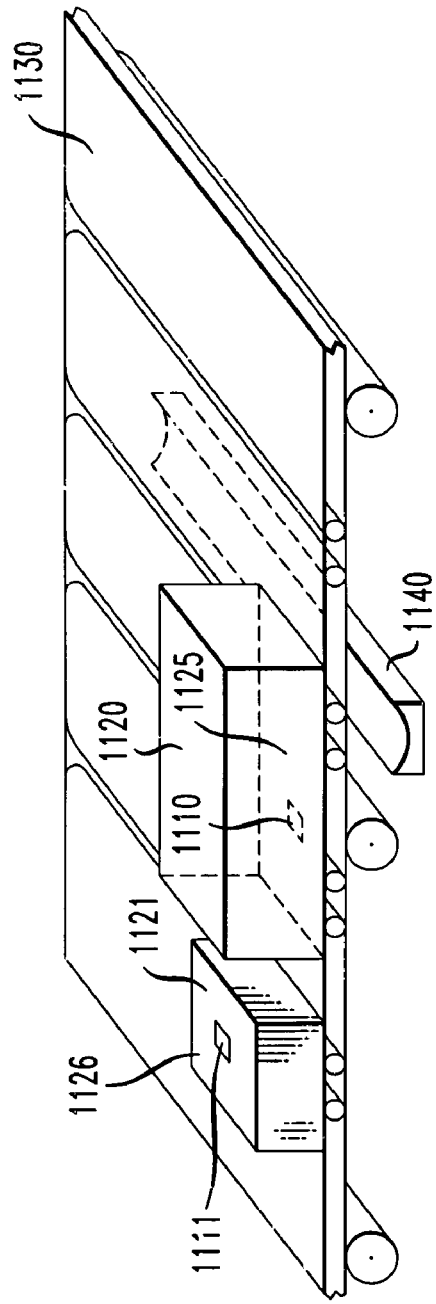
FIG. 11

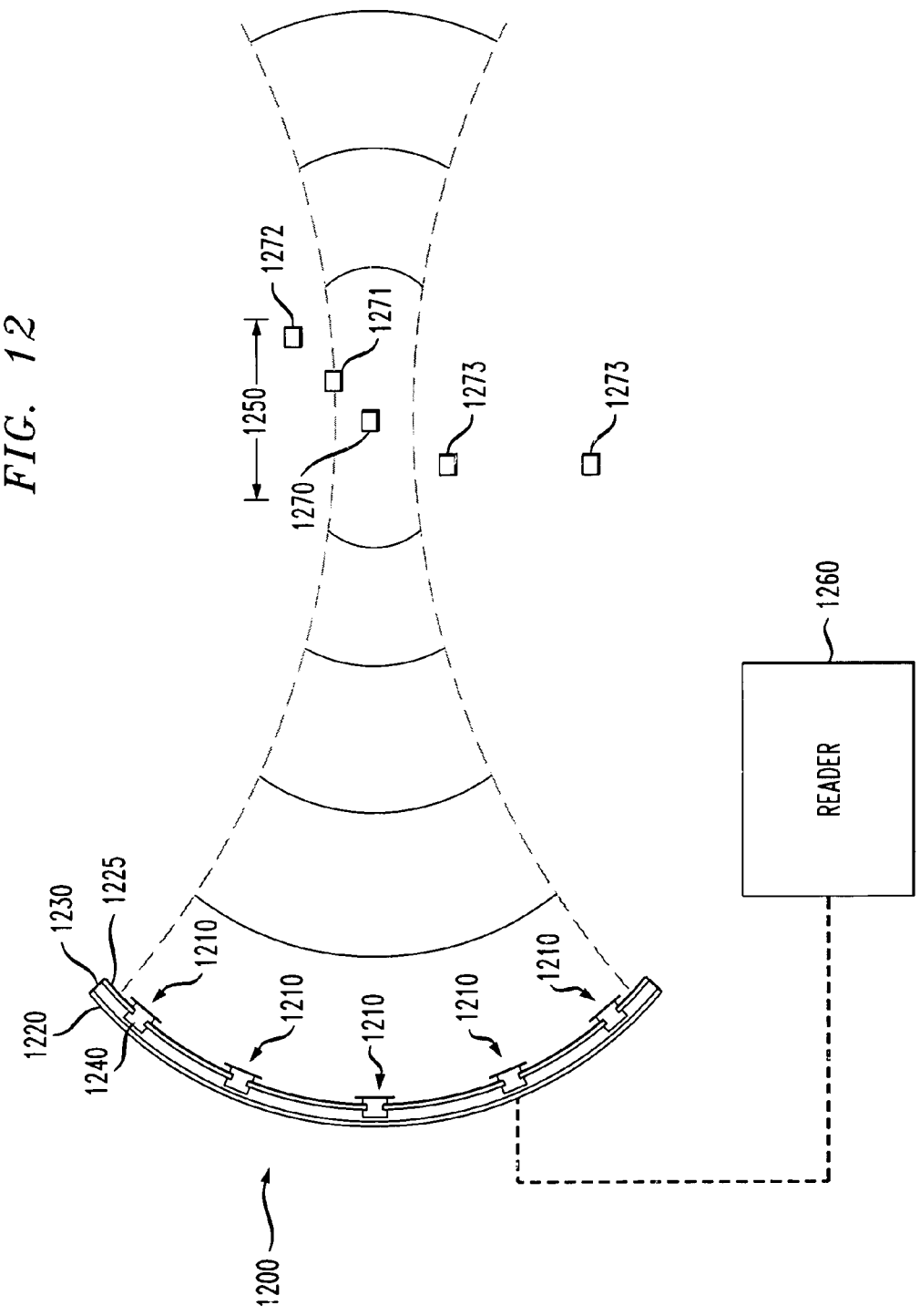

ANTI-COLLISION INTERROGATION PULSE FOCUSING SYSTEM FOR USE WITH MULTIPLE SURFACE ACOUSTIC WAVE IDENTIFICATION TAGS AND METHOD OF OPERATION THEREOF

CROSS-REFERENCE TO RELATED APPLICATION

This application is a continuation-in-part of U.S. patent application Ser. No. 10/103,650, filed on Mar. 21, 2002, entitled "Anti-Collision Interrogation Pulse Focusing System for Use With Multiple Surface Acoustic Wave Identification Tags and Method of Operation Thereof" to Clinton S. Hartmann, et al., which is incorporated herein by reference.

TECHNICAL FIELD OF THE INVENTION

The present invention is directed, in general, to a signal focusing system and, more specifically, to a system to discriminate between multiple surface acoustic wave (SAW) identification tags by focusing an interrogation pulse and a method of operation thereof.

BACKGROUND OF THE INVENTION

A number of different electronic identification methods and devices have been developed and are presently being used. We are all familiar with the ubiquitous bar codes and magnetic strips that, together with their readers, are widely employed by businesses. An inherent limitation in bar code and magnetic strip identification devices is the effective range at which they can be reliably read, which distance is quite short. Magnetic strips, for example, generally require the reader to be in direct contact with the strip in order to detect and decode data. In the very few cases where a magnetic strip is read with a device other than a direct contact reader, the effective reading range is still only a few centimeters at best. Similarly, the effective range at which bar codes can be reliably read is typically no better than a few centimeters. Because the read range for bar codes and magnetic strip is so short, they are usually read one at a time and seldom does one bar code or magnetic strip interfere with another.

Another prior art identification device is the radio frequency identification ("RFID") tag. When interrogated, RFID tags reflect or retransmit a radio frequency signal that returns an encoded identification number. Although these prior art RFID tags are based on a chip that has a longer reliable read range than magnetic strips or bar codes, they are expensive and not widely used. As a general rule, prior art RFID tags are read individually, leaving little opportunity for a coded response from one such tag to interfere with the coded response from another.

With the introduction of inexpensive identification tags based on surface acoustic wave (SAW) technology that can be read at a relatively long range, circumstances will arise where significant interference problems can occur from multiple tags returning coded responses. There is, of course, not a problem when an individual SAW identification tag is read, or even when a small group of SAW tags are read simultaneously.

Significant code collision problems occur when a large number of SAW tags are simultaneously interrogated and each tag simultaneously returns a coded response. Such is the case, for example, when a pallet of articles, each identified with a SAW identification tag, is interrogated and each tag returns a globally unique response code. Such a large number of coded response pulses makes it difficult for a SAW identification tag reader to accurately detect and decode each response and reliably identify each article on the pallet. Code collision problems as well as other inter-symbol interference problems caused by so many responses being transmitted at one time needs to be addressed before the full potential of SAW identification tags can be realized.

Accordingly, what is needed in the art is a system for focusing an interrogation pulse to within a defined space so that only SAW identification tags located within that space respond to an interrogation pulse, thus enabling a SAW identification tag reader to discriminate between coded responses.

SUMMARY OF THE INVENTION

To address the above-discussed deficiencies of the prior art, the present invention provides a system for avoiding code collisions from multiple SAW identification tags and a method of operating such system. In one embodiment the invention provides for (1) focusing an interrogation pulse to within a defined space; and (2) discriminating between coded responses returned from tags located within such defined space.

The present invention thus provides a system for controlling potential signal collisions where an interrogation signal can generate responses from multiple SAW identification tags. The system described herein is particularly beneficial when used in an environment where multiple SAW identification tags are simultaneously transmitting identification signals in response to an interrogation pulse. If a large enough number of responses are simultaneously generated within an allocated bandwidth, a SAW tag reader will have difficulty in accurately detecting and decoding such responses. The present invention limits the number of potential responses to a level where the SAW tag reader can accurately detect and decode responses to an interrogation signal.

In one embodiment of the invention the system uses beam steering to focus the interrogation pulse within the defined space. In another embodiment an antenna is used to focus the interrogation pulse within the defined space. An aspect of this embodiment provides for an antenna that is a parallel conductor pair. This is a particularly useful embodiment that permits interrogation while in close proximity to a SAW tag. In yet still another aspect of the invention, a helical antenna is used and, in still another, it is a dielectric waveguide antenna.

In another embodiment of the invention, a reflector is coupled to the antenna. One aspect of this embodiment provides for an antenna that is an elliptical trough which serves as a particularly effective focusing device. In another embodiment of the invention, the reflector is selected from the group consisting of: a circular reflector; a curved reflector; a parabolic reflector; a re-entrant cavity; and an elliptical reflector.

In another embodiment of the invention, the interrogation pulse is focused within the defined space by a waveguide. One aspect of this embodiment provides for a waveguide that projects a circular polarized beam. Another aspect of this embodiment provides for a waveguide with a first feed of about one-quarter wave length positioned at about a 90° position relative to a second feed of about one-quarter wave length. In another embodiment of the invention, a reflector is coupled to the waveguide. A particularly useful aspect of this embodiment provides for the reflector to be selected from the group consisting of: a circular reflector; a curved reflector; a parabolic reflector; a re-entrant cavity; and an elliptical reflector.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIGS. 5A–5B illustrate an embodiment of a helical antenna and a helical signal generating device with two feed inputs for producing a circular polarized interrogation signal;

FIG. 11 illustrates an isometric view of an embodiment of an antenna system constructed in accordance with the present invention for interrogating SAW identification tags located on a bottom surface of articles transported by a conveyor belt;

FIG. 12 illustrates a planar top view of an embodiment of an antenna mount with a series of aperture-coupled patch antennas mounted thereon to focus an interrogation pulse to within a defined focal area;

DETAILED DESCRIPTION

Figure 1:
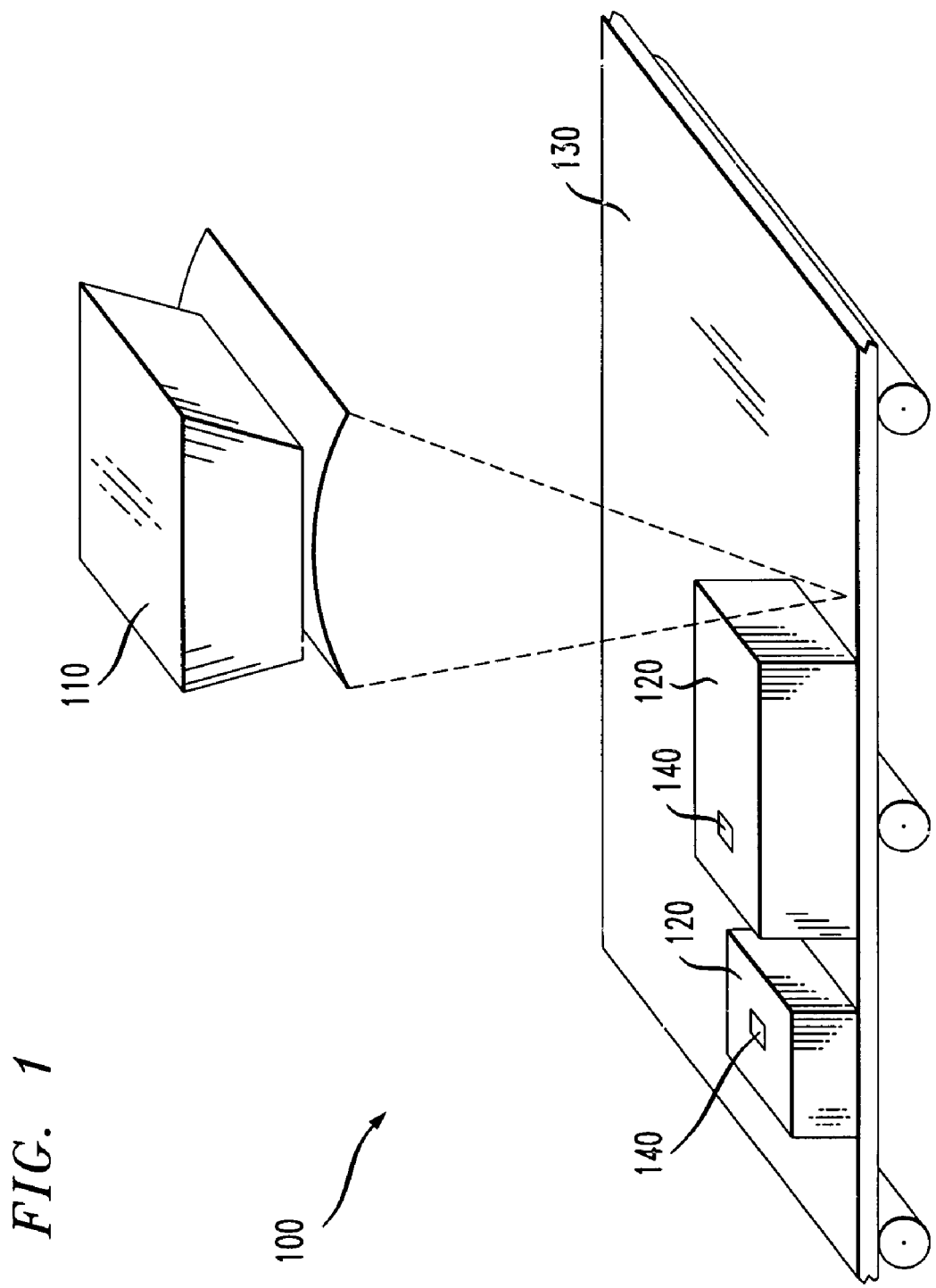
FIG. 1 illustrates a representative article handling device, such as that used to handle parcels or baggage, where an embodiment of a SAW identification tag reader is being used to identify articles.

Referring initially to FIG. 1, illustrated is a representative article handling device 100, such as that used to handle parcels or baggage, where an embodiment of a SAW Identification tag reader 110 is being used to identify articles 120. A conveyor bolt 130 being used to transport articles 120 from one location to another has a SAW identification tag reader 110 associated with it in a position where it can transmit interrogation pulses to generate responses from SAW tags 140 on the articles 120. Each SAW tag 140 responds tote interrogation pulse by transmitting its own globally unique coded response. The reader 110 detects and decodes these responses and identifies each SAW tag 140 and inferentially, the parcel 120 to which it is attached.

A complete and detailed description of SAW Identification tags 120 is set forth in detail in U.S. patent application Ser. No. 10/024,624, entitled "Surface Acoustic Wave Identification Tag Having Enhanced Data Content and Methods of Operation and Manufacture Thereof," Hartmann, Clinton S. ("Hartmann One"), commonly assigned with the invention and incorporated herein by reference. A description of SAW identification tag readers 130 is described in detail In U.S. Pat. No. 6,708,881B2, entitled "Reader For a High Information Capacity Saw Identification Tag and Method of Use Thereof," Hartmann, Clinton S. ("Hartmann Three"), also commonly assigned with the invention and incorporated herein by reference.

When a limited number of articles to be identified are transported on the conveyor belt 130, the SAW tag reader 110 will, most probably, isolate and decode each response. Such would be the case, for example, if the device 100 is a luggage handling apparatus where suitcases and other luggage items are transported on the conveyor belt 130 so that only one or two SAW tags 140 are interrogated at the same time. However, if a large number of SAW tags 140 are interrogated, such as a pallet of articles 120 each identified with a unique SAW tag 140, there will be a large number of responses. Where a large number of responses are simultaneously generated, it becomes difficult for the SAW tag reader 110 to accurately detect and decode each response and reliably identify each article 120. This problem of code collision is caused by the amount of data to be detected and processed as well as the inter-symbol interference from so many responses being transmitted at one time. The present invention provides a system for avoiding code collisions as well as a method of operating such a system.

The present invention provides a system for focusing an interrogation pulse to within a defined space so the SAW identification tag reader 110 can discriminate between coded responses. By using the present invention to focus an interrogation pulse within a definite space so only SAW tags within that space are interrogated, the problem of code collision can be more easily controlled. Because the SAW tag reader 110 will only receive a limited number of responses to an interrogation pulse, its ability to distinguish between SAW tag 140 responses will be enhanced and the articles 120 to which SAW tags 140 are attached can be accurately identified.

One embodiment of the invention uses beam steering for focusing the interrogation pulse within the defined space to permit the SAW tag reader 110 to more easily discriminate between coded responses. There are a number of different beam steering techniques known to those of ordinary skill in the pertinent art, all of which are within the intended scope of the present invention. These range from mechanically steering the interrogation pulse beam to using an antenna array with a sophisticated electronic phase shifting apparatus to steer the beam.

Figure 2A:
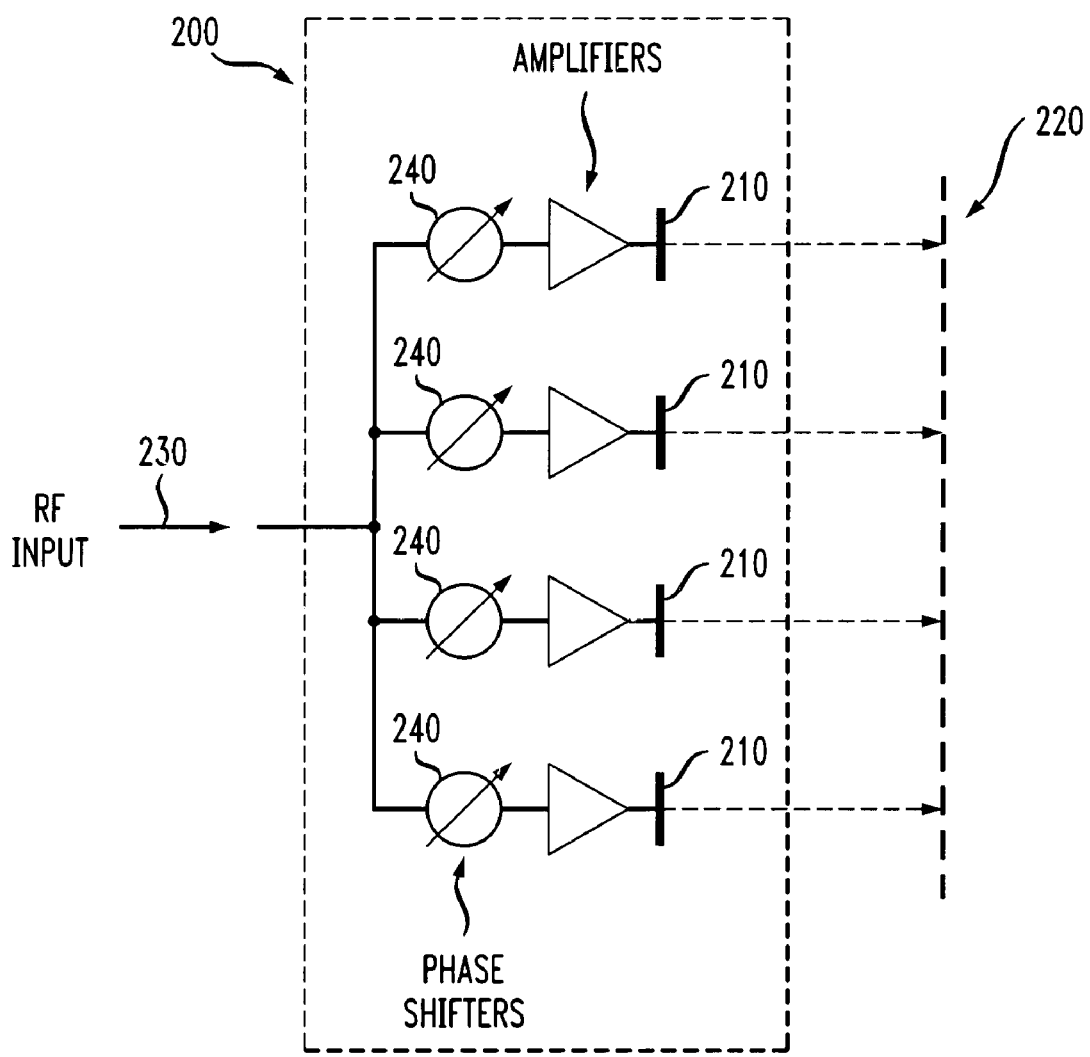
FIGS. 2A–2B illustrate a representative embodiment of an antenna array where signal phases delivered to the antennas are shifted to steer the transmitted interrogation pulse beam to a defined space.
Figure 2B:
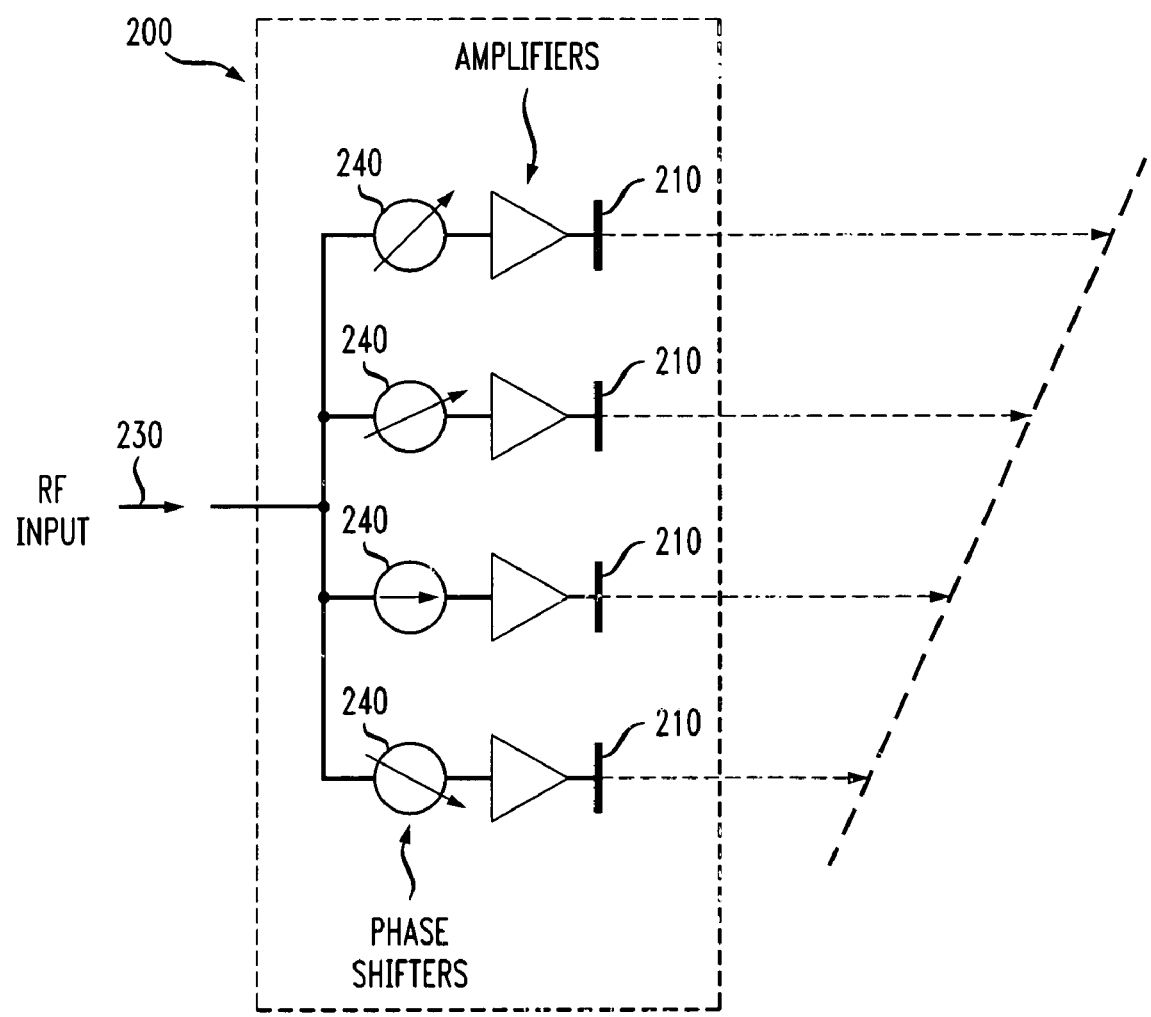

Turning now to FIGS. 2A–2B, illustrated is a representative embodiment of an antenna array 200 where signal phases delivered to the antennas 210 are shifted to steer the transmitted interrogation pulse 220 beam to a defined space. The input signal 230 to each antenna 210 in the array 200 is routed through an associated phase shifter 240, where the phase of the signal 230 delivered to the antenna 210 is shifted to steer the transmitted beam in a predetermined direction. If the phase of a signal 230 is not shifted, as illustrated in FIG. 2A, the signals 230 delivered to each antenna 210 will be in-phase and the interrogation pulse 220 will proceed directly away from the array 200. Illustrated in FIG. 2B is an example where the phase of the input signal 230 delivered to each antenna 210 is changed with the consequent result of redirecting the beam of the interrogation pulse 220.

An antenna array 200, such as that illustrated in FIGS. 2A and 2B, is especially useful because it lends itself to being fabricated as a printed antenna array 200. Using well known lithographic techniques, such printed antennas 210 can easily be integrated into printed circuits with the necessary electronics to control the phase of the signal to each antenna 210. Thus it is convenient to incorporate an entire antenna array 200 module into a SAW tag reader.

Figure 3:
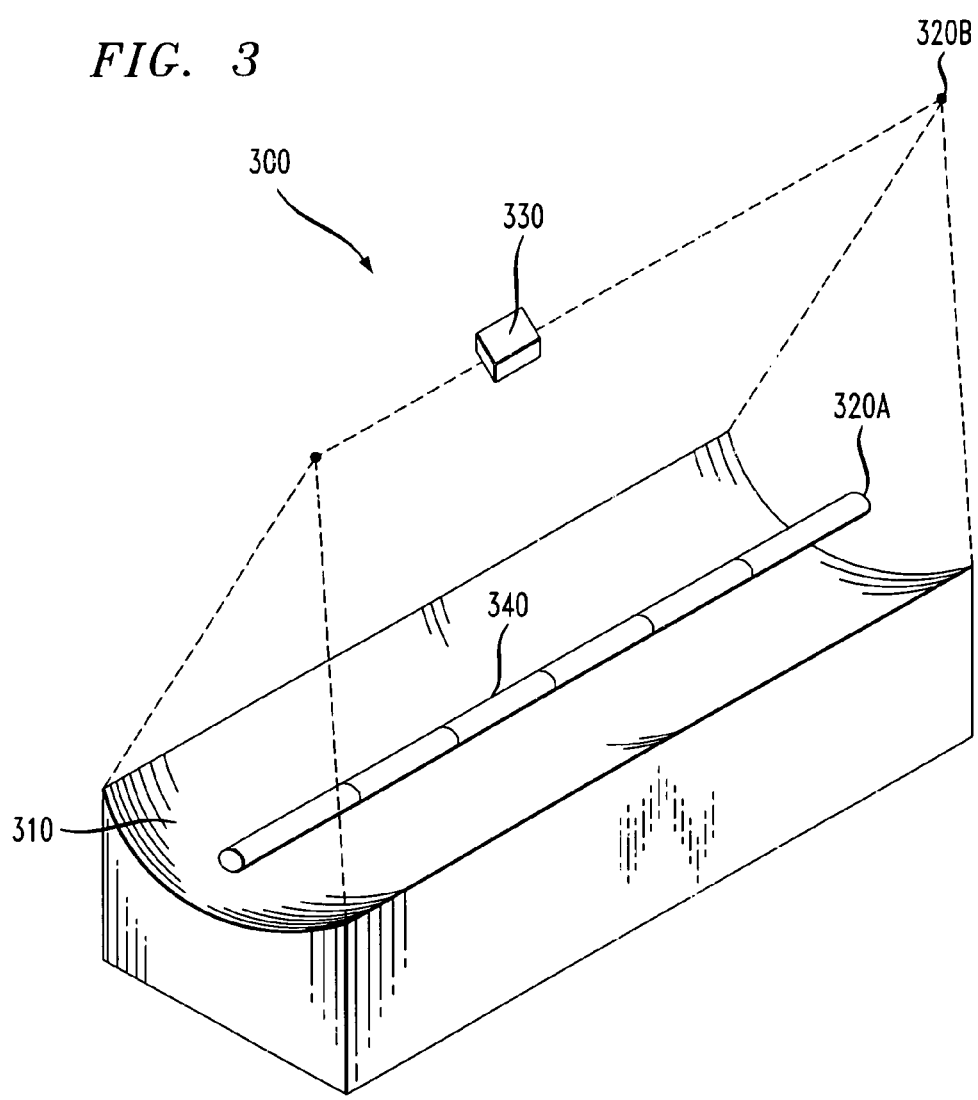
FIG. 3 illustrates an embodiment of an antenna configured as an elliptical trough for focusing an interrogation pulse within a defined space.

Turning now to FIG. 3, illustrated is an embodiment of an antenna 300 configured as an elliptical trough 310 for focusing an interrogation pulse within a defined space. Because an ellipse is a closed plane curve generated by a point moving in a manner that the sums of the distances between the moving point and two fixed points or foci 320A, 320B is a constant, an elliptical trough 310 is a particularly useful antenna configuration for reading SAW tags 330. When an interrogation signal is fed to an antenna 300 located at the first focal point 320A of the ellipse, the transmitted signal reflects and refocuses at the second focal point 320B where, optimally, a SAW tag 330 is interrogated. By using an elliptical trough 310 with a linear feed 340 extending the length of the trough 310, a second focal point 320B will also have a length equal to the linear feed 340. This is particularly useful for reading SAW tags 330 in certain environments, such as the article handling device 100 illustrated in FIG. 1. Where a SAW tag reader 110 has an elliptical trough 310 antenna 300, the second focal point 320B can be designed to extend across the width of the conveyor belt 130 so that each article 120 on the belt 130 is interrogated.

In another embodiment of the invention, the illustrated elliptical trough 310 is usefully employed in a cross beam configuration to precisely focus the interrogation signal and response. For example, one elliptical trough 310 used to transmit an interrogation signal can be positioned about perpendicular to another that receives a response, thus precisely focusing on the specific SAW tag 330 to be identified. As those of ordinary skill in the pertinent art will understand, either of the elliptical troughs 310 can be programmed to move in a sweeping pattern to provide a precisely focused beam across a field of interest, such as a conveyor belt where the trough 310 positioned across the belt is fixed but the trough 310 paralleling the belt is moved in a sweeping motion. Those of ordinary skill in the pertinent art will also understand that other configurations of elliptical troughs 310 as well other embodiments of antennas, waveguides and reflectors can also be used in an intersecting or cross beam focusing arrangement such as that described and be well within the intended scope of the present invention.

Figure 4:
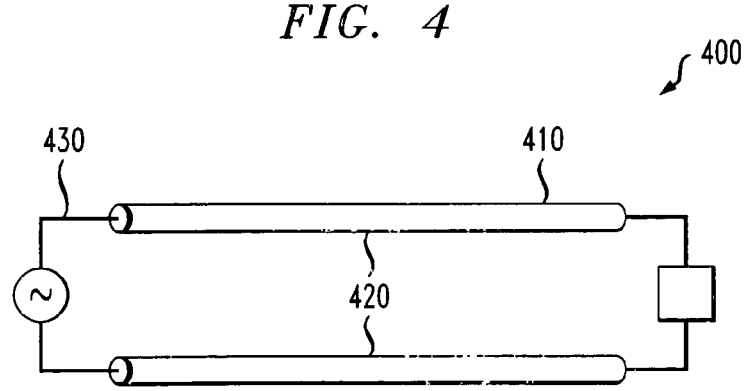
FIG. 4 illustrates an embodiment of a proximity wand reader using an antenna configured as a parallel conducting pair.

Turning now to FIG. 4, illustrated is an embodiment of a balanced feed proximity wand reader 400 using an antenna configured as a parallel conducting pair 410. The wand 400 has a parallel pair of transmission lines 420 that receive a feed signal 430. The feed signal 430 causes a field to develop around the wand 400 sufficiently strong enough to interrogate SAW tags by placing the wand 400 in close proximity. Those of ordinary skill in the pertinent art will understand that a single wire antenna can also be used with a wand 400 such as that illustrated and still be within the intended scope of the present invention.

Turning now to FIG. 5A, illustrated is an embodiment of a helical antenna 500 used to focus an interrogation pulse. The illustrated antenna 500 has a canister 510 around a helical signal generating device 520 (FIG. 5B) to which a pulse interrogation signal is delivered by two feed inputs 530 located at about ninety degrees relative to each other. The helical signal generating device 520 produces a circular polarized interrogation signal that can be directed to within a defined space by the canister 510 where a SAW tag 540 can be interrogated. Using a circular polarized signal to interrogate SAW tags 540 is particularly useful because a pulse can be delivered regardless of the SAW tag 540 orientation within a plane normal to the interrogation signal.

Figure 6A:
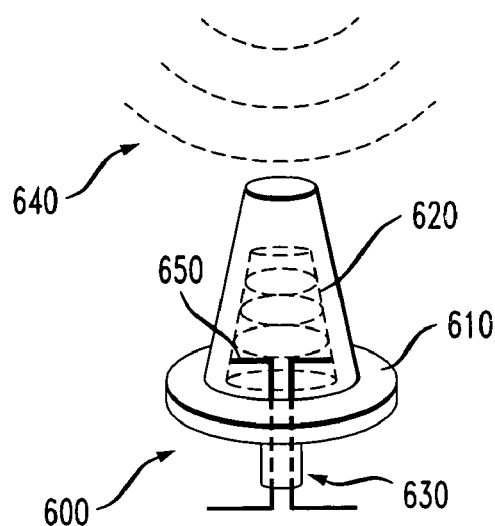
FIGS. 6A–6B illustrate embodiments of dielectric waveguide antenna structures for focusing an interrogation pulse.
Figure 6B:
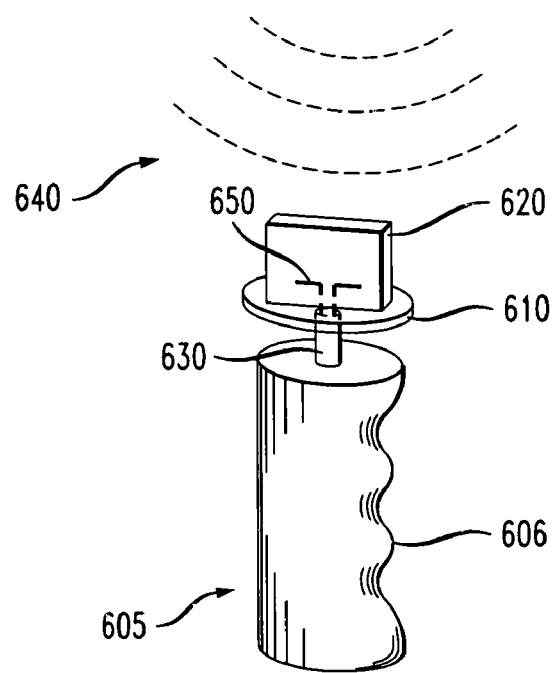

Turning now to FIGS. 6A–6B, illustrated are embodiments of dielectric waveguide antenna structures 600, 605 for focusing an interrogation pulse. The embodiment in FIG. 6B has a handle 606 that permits it to be used as a "wand" to focus interrogation pulses by hand. Each has a ground plane 610 with a dielectric waveguide 620 coupled thereto in an approximate normal position. A feed line 630, generally a coaxial cable, delivers an interrogation signal 640 or pulse to a dipole antenna 650 located within the dielectric waveguide 620. The propagation rate of the signal 640 through the dielectric material will be slower than such signal's 640 propagation rate in the air. The propagation rate of the signal 640 through the waveguide 620 material will also be dependent on the dielectric constant of such material. Because the distance the signal 640 must travel through the waveguide 620 before it reaches the surrounding air is a variable, the signal 640 will not all make the transition into the air at the same time. The waveguide 620 can be shaped, however, to provide for a significant portion of the propagated signal 640 to transition from the dielectric body of the waveguide 620 into the surrounding air at or near the same time, thus providing a concentrated signal 640 that is focused.

Figure 7:
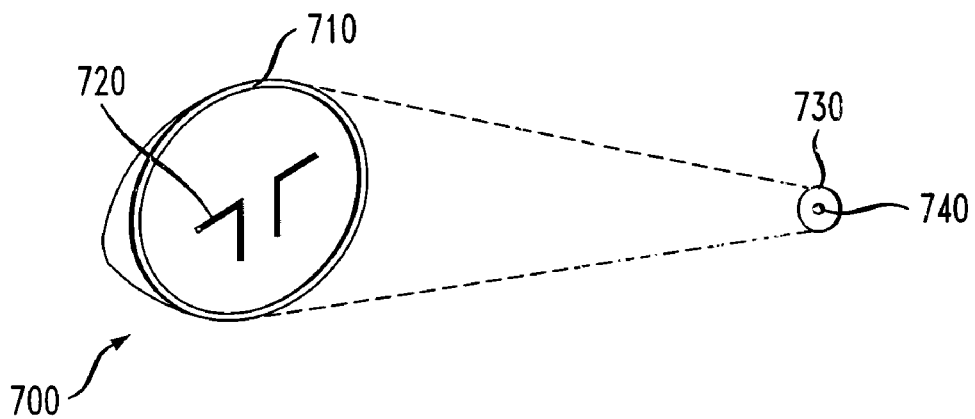
FIG. 7 illustrates an embodiment of an antenna apparatus with a reflector coupled to the antenna.

Turning now to FIG. 7, illustrated is an embodiment of an antenna apparatus 700 with a reflector 710 coupled to the antenna 720. The reflector 710 reflects the interrogation signal transmitted by the antenna 720 and focuses such signal to within a defined space within which a SAW tag 730 can be interrogated. Note that the illustrated reflector 710 has an elliptical shape that focuses the interrogation signal at a second focal point 740 where the SAW tag 730 is located. Although an elliptical shape can be advantageously used in certain situations, there are other situations calling for differently shaped reflectors. A useful aspect of this embodiment provides for the reflector to be selected from the group consisting of: a circular reflector; a curved reflector; a parabolic reflector; and an elliptical reflector. Of course, as will be understood by those of ordinary skill in the pertinent art, any reflector shape is within the intended scope of the present invention.

Figure 8:
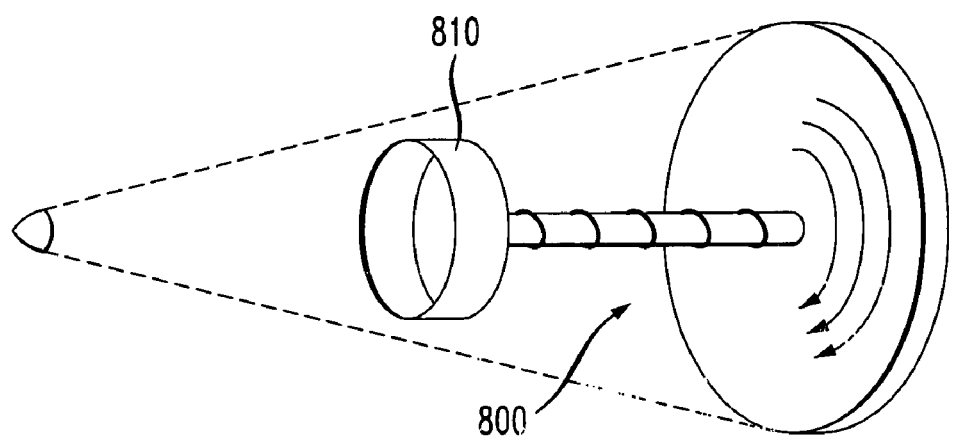
FIG. 8 illustrates an embodiment of a waveguide used to focus an interrogation pulse within a defined space.

Turning now to FIG. 8, illustrated is an embodiment of a helical source 800 for using circular polarized waves and a focusing antenna to address a SAW tag. Also illustrated is a re-entrant cavity 810 to provide directionality for the helical source. Focusing reflectors of the type illustrated are discussed in more detail above relative to FIG. 7. Of course, as was the case above, a reflector can be selected from the group consisting of: a circular reflector; a curved reflector; a parabolic reflector; and an elliptical reflector.

Figure 9A:
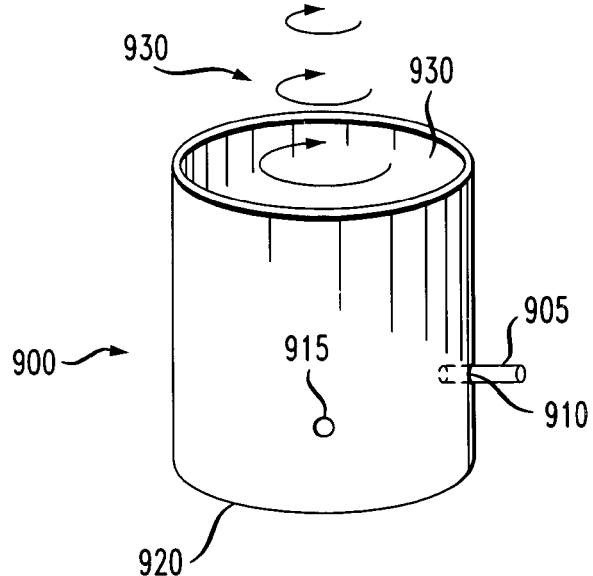
FIGS. 9A–9B, illustrate embodiments of an interrogation pulse focusing device constructed in accordance with the present invention that can be used to launch both right hand and left hand circular polarized interrogation pulses.
Figure 9B:
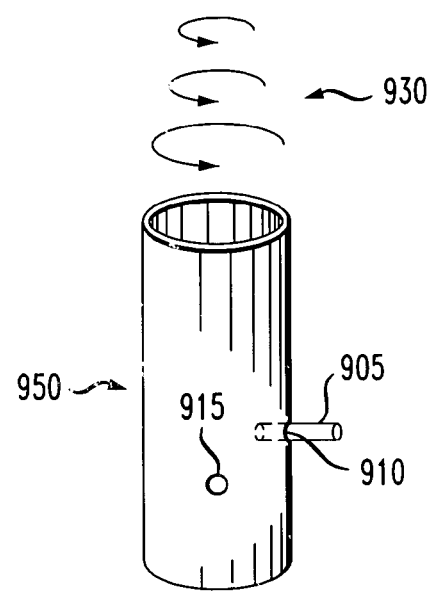

Turning now to FIGS. 9A–9B, illustrated are embodiments of an interrogation pulse focusing device 900, 950 constructed in accordance with the present invention that can be used to launch both right hand and left hand circular polarized interrogation pulses 930. In FIG. 9A, a thin walled closed end cylinder 905 with two inputs 910, 915 is used to launch either right hand or left hand circular polarized interrogation pulses 930. The illustrated embodiment is metallic with a closed first end 920 (not shown) and an open second end 930. The two inputs 910, 915 used to launch the circular polarized interrogation pulses 930 are located at about one quarter of a wavelength from the closed first end 920 and positioned on the circumference of the cylinder 900 at about 9020 relative to each other.

To launch a circular polarized pulse from the cylinder 900, a signal is fed to the cylinder 900 via the inputs 910, 915 which are positioned so they have a 90° degree phase angle delay relative to each other. For example, if a left hand polarized pulse is to be launched, the phase angle of the signal fed to the first port 910 will be a 0° while the phase angle of the signal fed to the second port 915 will be −90° relative to the first port 910 signal. This input produces a $TE_{11}$ electric field with a consequent clockwise rotating e field, thus launching a right hand circular polarized pulse 930 that retains its circular polarity after leaving the device 900. To launch a left hand circular polarized pulse 930, the phase angle of the signal fed to the second port 915 would have a +90° phase angle difference with respect to the phase angle of the signal fed to the first port 910. Those of ordinary skill in the pertinent art will understand that any transverse electric or transverse magnetic pattern can be produced and be within the intended scope of the present invention.

The embodiment illustrated in FIG. 9B functions in the same manner as that illustrated in FIG. 9A, except a solid dielectric cylinder 950 is used to launch right and left hand polarized pulses. This is particularly useful embodiment because a thin dielectric structure can be made that provides for a neat, compact device for launching either right hand and left hand circular polarized pulses 230. Of course, a dielectric cylinder 950 similar to that illustrated in FIG. 9A with a metallic surface, such as a plated surface, can also be used to launch circular polarized pulses and be within the intended scope of the present invention. As those of ordinary skill in the pertinent art will understand, the embodiments illustrated in FIGS. 9A–9B can be combined with reflector embodiments previously described herein and still be well within the intended scope of the present invention.

Figure 10:
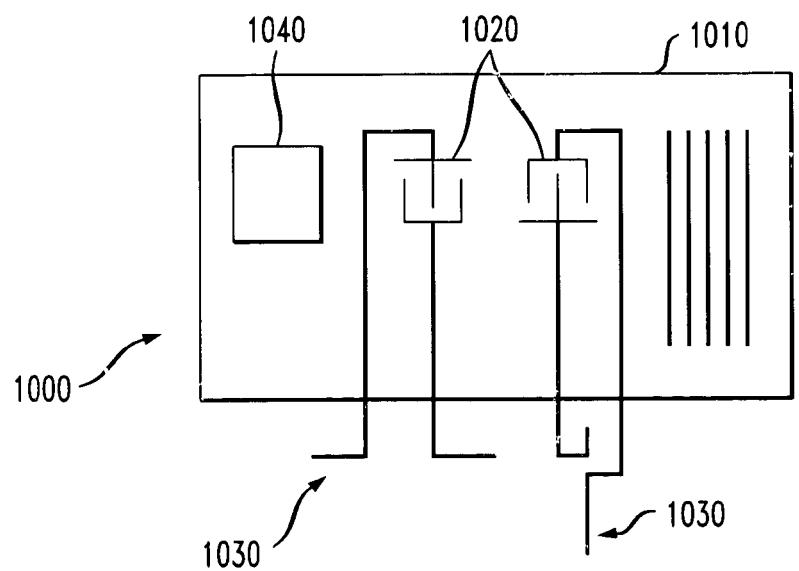
FIG. 10 illustrates a SAW tag embodiment where the response to an interrogation pulse can be turned off.

Turning now to FIG. 10, illustrated is a SAW tag 1000 embodiment where the response to an interrogation pulse can be turned off. A detailed description of SAW tags 1000 of the type illustrated is set forth in Hartmann One. The illustrated SAW tag 1000 has a substrate 1010 with a pair of transducers 1020 located thereon. As described below, depending on the phase of the transducers 1020 relative to one another, a SAW tag 1000 response can be turned off or on when interrogated by a right or left hand circular polarized interrogation pulse. Such a SAW tag 1000 can be usefully employed with interrogation pulse focusing devices of the type illustrated in FIGS. 9A–9B.

In one embodiment of the invention the phase centers of the two transducers 1020 are separated by $(2n + \frac{1}{2})\pi$ where n is an integer. In phase and quadrature antennas 1030 on the SAW tag 1000 that receive interrogation pulses directed to the transducers 1020 are oriented in positions 90° relative to each other. This means that circular polarized signals incident on such antennas 1030 will be in-phase in one direction and out-of-phase in the other. Each transducer 1020 will receive and generate a SAW only when it receives an in-phase signal. This feature is used to generate a unidirectional SAW that can be advantageously used to switch a SAW tag 1000 off. The "switch" that shuts the SAW tag 1000 down in the embodiment illustrated is an absorbing reflector 1040 that absorbs the SAW and does not return a response. The absorbing reflector 1040 and transducers 1020 can be constructed to absorb either right or left hand polarized interrogation pulses. Thus, if the SAW tag 1000 constructed to absorb a left band polarized interrogation pulse It will only launch a SAW generating a response when a right hand polarized pulse is received. In short, the SAW tag 1000 is turned off when a left band polarized pulse is received because the SAW from the transducer 1020 that received the left hand polarized pulse is absorbed by the absorbing reflector 1040.

The present invention also provides a method of operating a system for avoiding code collisions from multiple SAW identification tags. In one embodiment the method provides for focusing an interrogation pulse to within a defined space and discriminating between the coded responses returned from tags located within that defined space. Such embodiment will be clear to those of ordinary skill in the pertinent art from the detailed description of the system itself. The additional embodiments of a method of operating the system described herein will likewise be clear to those of ordinary skill in the pertinent art based on the descriptions set forth.

Turning now to FIG. 11, illustrated is an isometric view of an embodiment of an antenna system 1100 constructed in accordance with the present invention for interrogating SAW identification tags 1110 located on a bottom surface 1125 of articles 1120 transported by a conveyor belt 1130. The system 1100 provides for an antenna 1140 mounted beneath the conveyor belt 1130 to transmit an interrogation pulse that illuminates a SAW identification tag 1110 located on the bottom surface 1125 (the defined space) of a transported article 1120. The interrogation pulse signal will, of course, excite a coded response pulse from any SAW identification tag 1110 receiving a sufficiently robust signal, including those located on other surfaces when, for example, a reflected signal is received.

The present invention usefully expands the defined space within which SAW identification tags 1110 can be interrogated. By using a reflector 1150 that is judiciously placed, an interrogation pulse signal can be redirected and the defined space significantly increased within which SAW identification tags can be read. In the illustrated embodiment, for example, the reflector 1150 is located to focus a reflected interrogation pulse signal to illuminate SAW identification tags 1111 located on a top surface 1126 of an article 1121, an area tat would generally not receive an interrogation pulse signal except for random reflections. The reflector 1150 is also used to reflect coded response pulses back to the antenna 1140.

The defined space interrogated in FIG. 11 now includes at least the bottom 1125 and top 1126 surface areas of articles 1120, 1121, and probably side surfaces as well. For a number of reasons, including proximity and range, the system 1100 operates with a higher degree of efficiency and with increased reliability when a separately located reflector 1150 is used for redirecting interrogation and response pulses. A SAW tag reader will be associated with the antenna 1140 for processing coded response pulses and, in some embodiments, it may also be directly associated with the reflector 1150. Using a separately located reflector 1150 provides an economical method for expanding the usefulness of SAW tag identification systems because reflectors are cheap when compared to antennas and the connectivity cost attendant thereto.

Other embodiments of the invention provide for a plurality of antennas 1140 that transmit interrogation pulses. In yet another embodiment, a plurality of reflectors 1150 are used to reflect interrogation pulses. While in still another embodiment, a plurality of antennas 1140 and a plurality of reflectors 1150 are used. As those of ordinary skill in the pertinent art will recognize, a judicious placement of one or more antennas 1140 and one or more reflectors 1150 about a defined space increases the probability that all SAW identification tags 1110 within that space will be illuminated and that all coded response signals will be detected and identified.

As noted previously, when a large number of SAW identification tags 1110 are simultaneously interrogated, inter-symbol interference inevitably occurs, making it difficult to precisely decode response pulses. When the number of coded response pulses is reduced, the inter-symbol interference problem is also reduced. One method, discussed above, used to reduce the number of coded response pulses is to use circular polarized interrogation pulses to effectively shut off SAW identification tags 1110 not constructed to respond to the appropriate polarity.

Turning now to FIG. 12, illustrated is an embodiment of the present invention showing a planar top view of an antenna mount 1200 with a series of aperture-coupled patch antennas 1210 mounted thereon to focus an interrogation pulse to within a defined focal area 1250. The general operation and construction of aperture-coupled patch antennas 1210 is described in detail in GARG, R. et al., MICROSTRIP ANTENNA DESIGN HANDBOOK (2001) (Garg), incorporated herein by reference.

As described in Garg, the basic configuration of a patch antenna 1210 is a substrate with a feed layer 1220 and non-feed layer 1225 separated by a dielectric 1230. The dielectric 1230 has a slot 1240 or aperture therein located beneath a patch antenna 1210 mounted on the non-feed layer 1225. In the illustrated embodiment, a SAW tag reader 1260 sends an interrogation pulse signal to the feed layer 1220 which electromagnetically couples to the patch antenna 1210 for transmission through the slot 1240. Those of ordinary skill in the pertinent art will understand that the shape and size of the slot 1240 can be varied depending on the desired parameters of the signal to be transmitted. As also understood by those of ordinary skill in the pertinent art, other signal parameters, such as bandwidth, can also be controlled by varying the thickness and dielectric constant of the feed layer 1220 and non-feed layer 1225, as well as the thickness of the dielectric 1230 between layers 1220, 1225.

The interrogation pulse signal is transmitted from each patch antenna 1210 in a lobe shaped signal pattern. The illustrated embodiment uses a curved mount 1200 to substantially focus the lobe shaped signal pattern transmitted by each patch antenna 1210 to within a defined focal area 1250. By concentrating the signal in this manner, the interrogation pulse becomes significantly stronger within the focal area 1250. The strength of the signal in the defined focal area 1250 assures that SAW identification tags 1270 within such area 1250 are excited into generating a coded response pulse. In most cases, SAW identification tags 1271 only partially within the defined focal area 1250 will also generate a coded response pulse as will those SAW tags 1272 in close proximity to the focal area 1250. However, those SAW identification tags 1273 sufficiently remote from the focal area 1250 will not be receiving a strong enough signal to generate a coded response pulse.

In one embodiment of the invention, electronic beam steering techniques are used to substantially focus the lobes of the interrogation pulse signal. Although, one embodiment of the present invention provides for three aperture-coupled patch antennas 1210 and another ten, those of ordinary skill in the pertinent art will understand that any number of aperture-coupled patch antennas 1210 can be used and still be within the intended scope of the present invention.

In one embodiment of the invention, the mount 1210 is movable. The mount 1200 can be made moveable physically with an electric motor or similar device, or it can be made moveable electronically by using beam steering techniques. In either case, the defined focal area 1250 can be moved to target areas for interrogation.

Figure 13A:
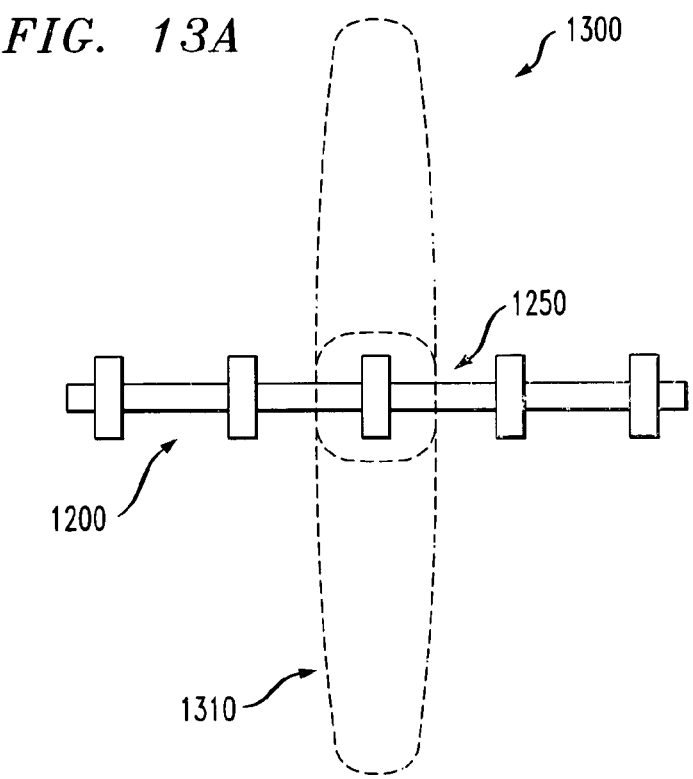
FIGS. 13A and 13B illustrate a front and side view, respectively, of an embodiment of a radiation pattern formed by the antenna structure illustrated in FIG. 12.
Figure 13B:
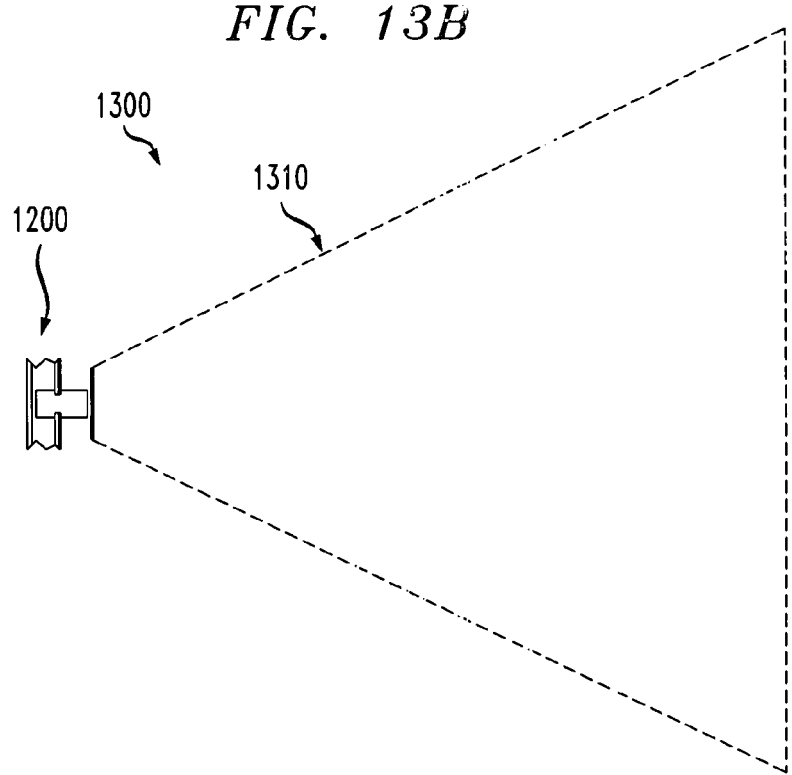

Turning to FIGS. 13A and 13B, illustrated are planar front and side views, respectively, of a radiation pattern 1300 extending outward from the antenna structure 1200 illustrated in FIG. 12. Referring to the top view of the antenna mount 1200 in FIG. 12, the interrogation signal transmission pattern is substantially focused within one dimension or axis to form the defined focal area 1250. A view normal to the radiation pattern shown in FIG. 12, shows a radiation pattern forming a curtain 1310 extending outwardly in a fan shaped pattern from the antenna structure 1200. This is shown in FIGS. 13A and 13B, where the fan-shaped radiation pattern extends outwardly in a swath to form the curtain 1310. A curtain 1310 such as that illustrated can be advantageously used in a number of applications, some of which are hereinafter described.

Figure 14:
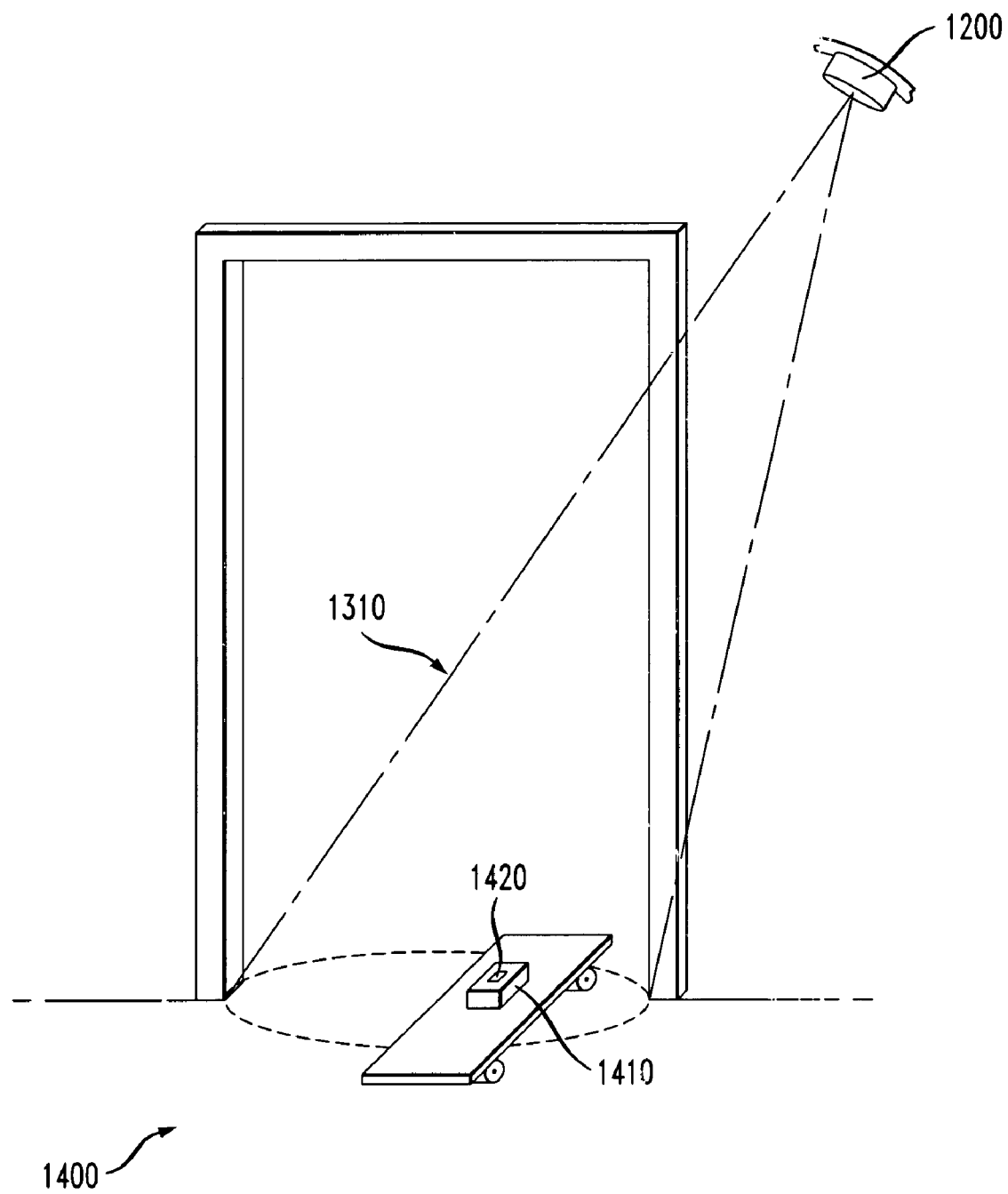
FIG. 14 illustrates an isometric view of a door with an embodiment of the antenna structure illustrated in FIG. 12 located thereon to form a curtain for detecting an object passing through that is tagged with a SAW identification tag.

Turning to FIG. 14, illustrated is an isometric view of a door 1400 with an embodiment of the antenna structure illustrated in FIG. 12 located thereon to form a curtain 1310 to detect an object 1410 passing through that is tagged with a SAW identification tag 1420. Another embodiment of the invention employs a curtain 1310 to cross the surface of a conveyor belt to read SAW identification tags 1420 on objects 1410 transported thereon. In still another embodiment, with broad applicability for inventory control and security purposes, a curtain 1310 is associated with a warehouse space or a loading dock. By using a movable antenna mount 1200, the curtain 1310 can be used to sweep a specified space. The invention is even more versatile when a circular polarized interrogation pulse is used.

Figure 15:
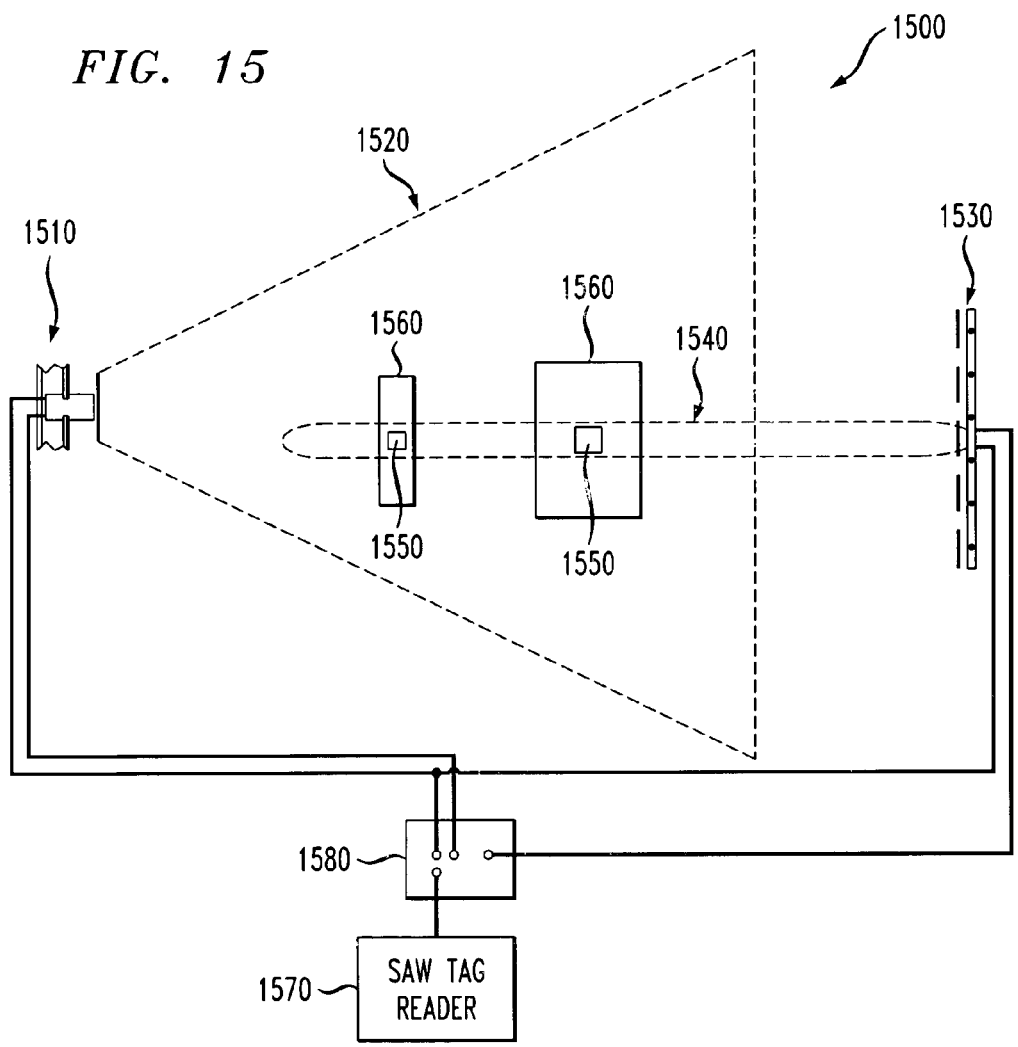
FIG. 15 illustrates a representative layout of an embodiment of an antenna system where a first focusing antenna substantially focuses an interrogation pulse to form a transmission curtain and a second focusing antenna substantially focuses a reception area to form a reception curtain for receiving a response pulse.

Turning now to FIG. 15, illustrated is a representative layout of an embodiment of an antenna system 1500 where a first focusing antenna 1510 substantially focuses an interrogation pulse to form a transmission curtain 1520 and a second focusing antenna 1530 substantially focuses a reception area to form a reception curtain 1540 for receiving a response pulse. The reception curtain 1540 intersects, but is not co-planar with, the transmission curtain 1520. Thus, only SAW identification tags 1550 on articles 1560 within the area where the transmission curtain 1520 and the reception curtain 1540 are coincident will return a detectable response pulse. In the illustrated embodiment, a single SAW tag reader 1570, using a directional coupler 1580 to route signals, transmits interrogation pulses to the first focusing antenna 1510 and receives response pulses from the second focusing antenna 1530.

Although the illustrated system 1500 shows an orthogonal relationship between the transmission curtain 1520 and the receiving curtain 1540, those of ordinary skill in the pertinent art will recognize that the curtains 1520, 1540 do not necessarily have to be orthogonal to be within the intended scope of the present invention. For example, in those embodiments where one or both of the antennas 1510, 1530 are used for scanning an area, the curtains 1520, 1540 will not be orthogonal for a majority of the time. In another embodiment of the invention, a circular polarized interrogation pulse is used.

Without being limited to and for illustration purposes only, the illustrated system 1500 can be usefully employed for a number of purposes, such as (i) performing a multi-axis search for SAW identification tags within a defined space; (ii) detecting SAW identification tags traversing more than one plane within a defined space; or (iii) providing a very intense focal area for an interrogation pulse.

Figure 16:
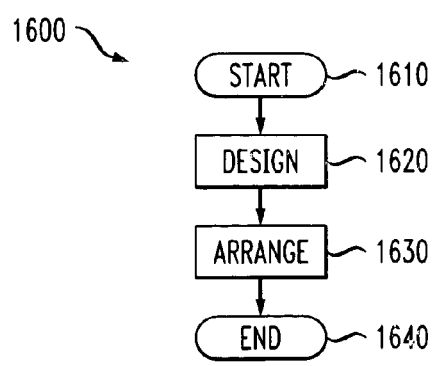
FIG. 16 illustrates a block diagram of a method for detecting movement of a SAW identification tag within a defined space.

Turning now to FIG. 16, illustrated is a block diagram of a method 1600 for detecting movement of a SAW identification tag within a defined space. The method 1600 commences with a start step 1610. In a design step 1620, a curtain is designed for use within the defined space using embodiments of the invention described herein. This curtain is designed to detect SAW identification tags moving through the space about which it is disposed. In an arranging step 1630, a plurality of slot-fed patch antennas are arranged to substantially focus an interrogation pulse to identify SAW identification tags moving through the curtain. The method concludes with an end step 1640.

Although the present invention has been described in detail, those skilled in the art should understand that they can make various changes, substitutions and alterations herein without departing from the spirit and scope of the invention in its broadest form.

What is claimed is:

1. An antenna system for use with a SAW identification tag system, comprising:
    an antenna associated with a SAW identification tag reader for transmitting an interrogation pulse; and
    a reflector, separate from said antenna, for reflecting said interrogation pulse to illuminate SAW identification tags located within a defined space and reflecting coded response pulses from said SAW identification tags to said antenna.

2. The antenna system as described in claim 1 wherein said antenna further provides said coded response pulses to said SAW identification tag reader.

3. The antenna system as described in claim 1 further comprising further antennas for transmitting said interrogation pulse.

4. The antenna system as described in claim 1 further comprising a plurality of receiving reflectors for receiving said coded response pulses.

5. The antenna system as described in claim 1 wherein said interrogation pulse is circular polarized.

6. An antenna system for use with a SAW identification tag system, comprising:
    a plurality of aperture-coupled patch antennas for substantially focusing an interrogation pulse to a defined focal area; and
    a SAW identification tag reader coupled to said plurality of aperture-coupled patch antennas, said SAW identification tag reader detecting coded response pulses from SAW identification tags located with said defined focal area.

7. The antenna system as described in claim 6 further comprising an antenna mount for holding said plurality of aperture-coupled patch antennas.

8. The antenna system as described in claim 7 wherein said antenna mount is curved to provide said defined focal area.

9. The antenna system as described in claim 6 wherein beam steering is used to provide said defined focal area.

10. The antenna system as described in claim 6 wherein said plurality of aperture-coupled patch antennas number is at least three.

11. The antenna system as described in claim 6 wherein said plurality of aperture-coupled patch antennas number is at least ten.

12. The antenna system as described in claim 6 wherein said plurality of aperture-coupled patch antennas are arranged to form a curtain about normal to said defined focal area.

13. A method for using a SAW identification tag system to detect the movement of a SAW identification tag, comprising:
    arranging a plurality of aperture-coupled patch antennas to substantially focus an interrogation pulse to within a defined focal area and form a curtain about normal to said defined focal area; and
    positioning said curtain about a defined space such that SAW identification tags are detected when traversing said curtain.

14. The method as described in claim 13 wherein said defined space is selected from the group consisting of:
    a doorway,
    a conveyor belt surface,
    a warehouse space, and
    a loading dock.

15. The method as described in claim 13 wherein said curtain is movable.

16. The method as described in claim 13 wherein said interrogation pulse is circular polarized.

17. An antenna system for use with a SAW identification tag system, comprising:
    an antenna associated with a SAW identification tag reader for transmitting an interrogation pulse; and
    a reflector, separate from said antenna, for reflecting said interrogation pulse to within a defined space for exciting a SAW identification tag located within said defined space such that said tag generates a coded response pulse, said reflector reflecting said coded response pulse to said antenna.

18. The antenna system as described in claim 17 further comprising further antennas for transmitting said interrogation pulse.

19. The antenna system as described in claim 17 further comprising further reflectors.

20. The antenna system as described in claim 17 wherein said interrogation pulse is circular polarized.

21. An antenna system for use with a SAW identification tag system, comprising:
  a first focusing antenna to substantially focus an interrogation pulse to form a transmission curtain; and
  a second focusing antenna to substantially focus a reception area to form a reception curtain for receiving a response pulse, said reception curtain intersecting, but not co-planar with, said transmission curtain.

22. The antenna system as described in claim 21 wherein said reception curtain is about orthogonal to said transmission curtain.

23. The antenna system as described in claim 21 wherein said transmission curtain is movable.

24. The antenna system as described in claim 21 wherein said reception curtain is movable.

25. The antenna system as described in claim 21 wherein said interrogation pulse is circular polarized.

* * * * *